Sept. 12, 1933.    F. R. DONOHO    1,926,973
SAND TRAP PLOW
Filed Nov. 5, 1932    2 Sheets-Sheet 1
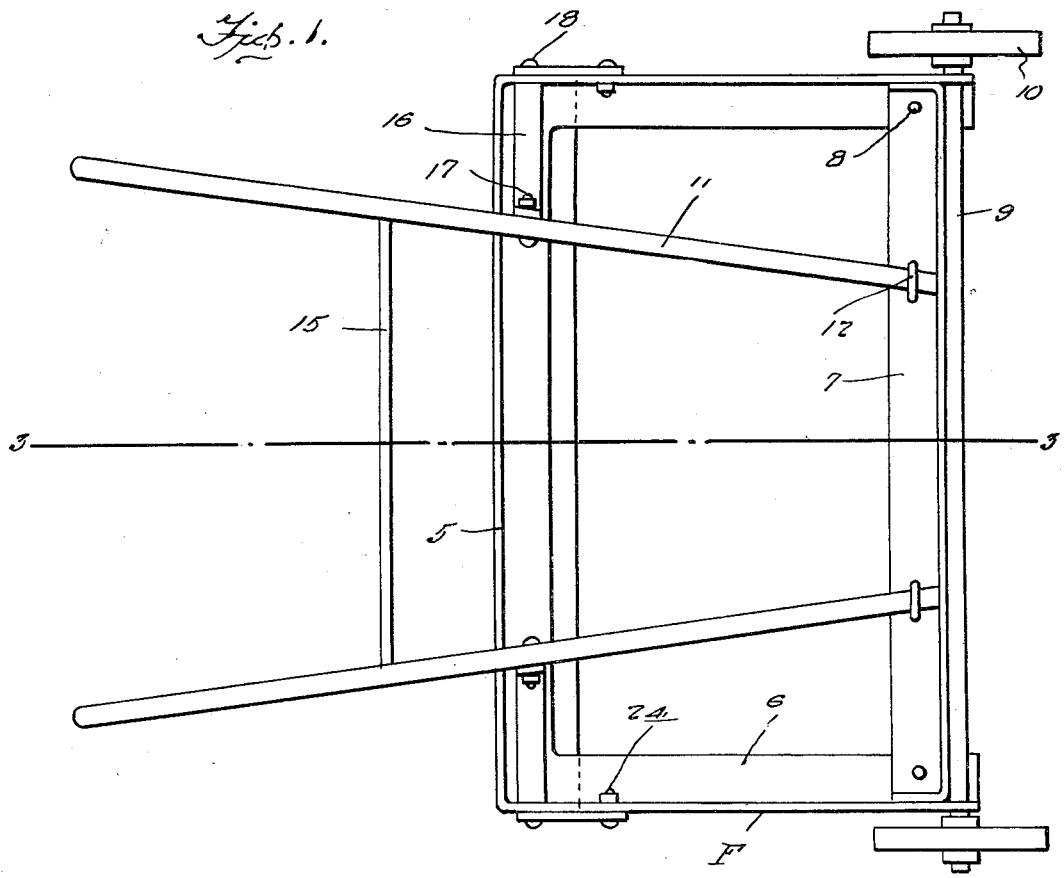
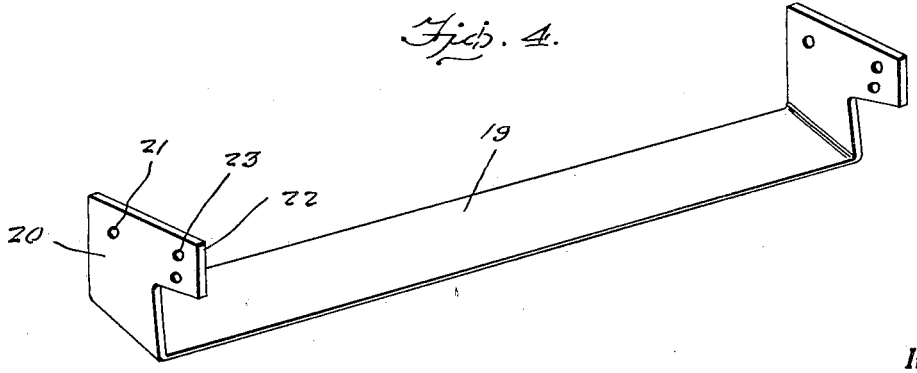
Inventor
*Frank R. Donoho*
By *Clarence A. O'Brien*
        Attorney Sept. 12, 1933.    F. R. DONOHO    1,926,973
SAND TRAP PLOW
Filed Nov. 5, 1932    2 Sheets-Sheet 2
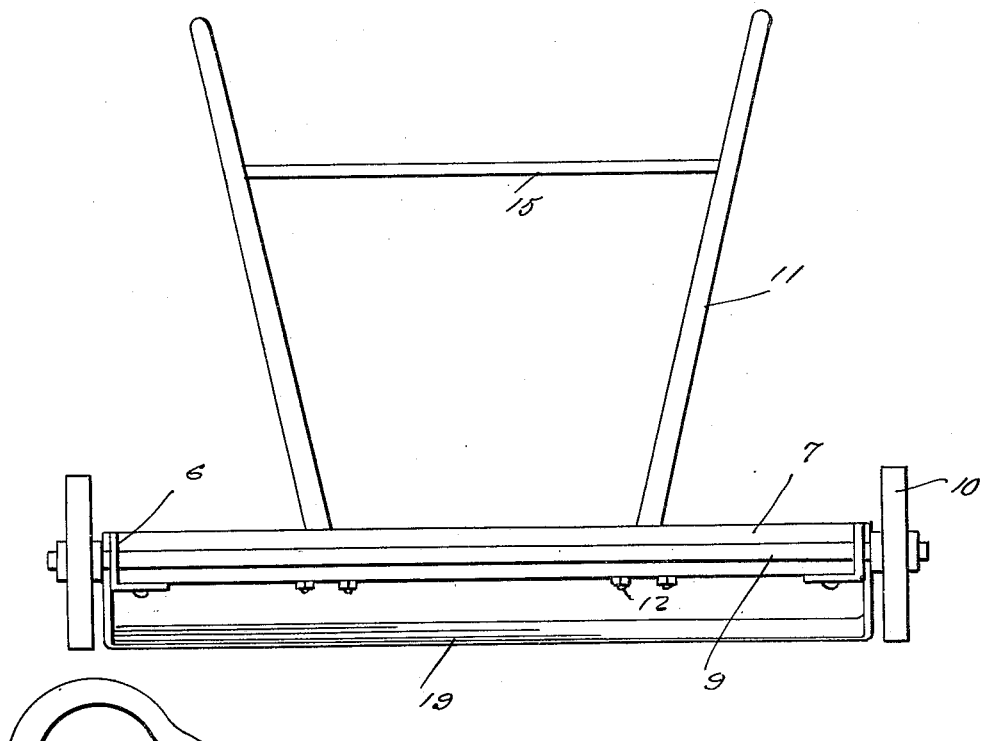
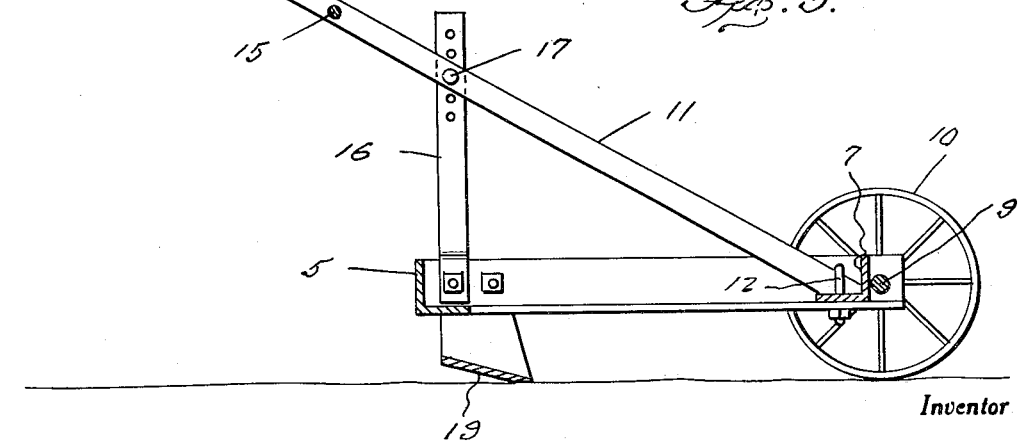
Inventor
Frank R. Donoho
By Clarence A. O'Brien
Attorney Patented Sept. 12, 1933

1,926,973

UNITED STATES PATENT OFFICE 1,926,973

SAND TRAP PLOW

Frank Richard Donoho, Weaverville, N. C.

Application November 5, 1932. Serial No. 641,447

1 Claim. (Cl. 97—144.1)

The present invention relates to sand trap plows designed particularly for use on golf courses and has for its prime object to provide means whereby vegetation growing in the sand trap may be quickly, easily and effectively destroyed.

Another very important object of the invention resides in the provision of an implement of this nature which is handy, simple in construction, inexpensive to manufacture, thoroughly reliable in use, strong and durable and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

In the drawings:

Figure 1 is a top plan view of the implement embodying the features of my invention.

Figure 2 is a front elevation thereof.

Figure 3 is a vertical longitudinal section therethrough taken substantially on the line 3—3 of Figure 1, and Figure 4 is a perspective view of the blade.

Referring to the drawings in detail it will be seen that the letter F denotes generally a substantially U-shaped frame formed of angle iron to provide a cross member 5 having forwardly directed sides 6. An angle iron cross member 7 is disposed between the sides a slight distance to the rear of the extremities thereof and is riveted or otherwise secured thereto as at 8. An axle 9 extends through openings in the extermities of the sides 6 and there is a pair of wheels 10 journalled on the ends of this axle to the outer side of the frame. A pair of elongated handle bars 11 are secured to intermediate portions of the cross bar 7 at points equidistant from the center thereof by means of U-bolts 12 and incline upwardly and rearwardly to terminate rearwardly of the cross member 5 of the frame F and have a brace rod 15 between intermediate portions thereof to the rear of the frame. Braces 16 are bolted as at 17 to intermediate portions of the handle bars 11 and are bolted as at 18 to the frame F.

Numeral 19 denotes an elongated blade disposed transverse under the rear portion of the frame F. This blade 19 is formed at its end with risers 20 having openings 21 to receive bolts 18. The upper portions of the risers are formed with forwardly directed extensions 22 having pluralities of openings 23 therein and bolts 24 extend through openings in the sides 6 and through the openings 23 whereby the blade 19 may be adjusted to different angles to the horizontal. It will be noted that the blade 19 is disposed obliquely to the median vertical dimensions of the risers 20.

It is thought that the construction and operation of this sand trap plow will be clearly understood since it is apparent that an operator may push the same so as to cause the blade to move under the top surface of the sand trap thereby severing weeds, grass and other vegetation which may be growing therein. The wheels 10 should have their rims or tires of sufficient width to permit the device to be pushed over the surface of the sand trap.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

An implement of the class described comprising a substantially U-shaped frame formed of angle iron, an angle iron cross piece connecting the limbs of said frame together adjacent the extremities of said limbs, said limbs extending forwardly, a shaft passing through the ends of said limbs, wheels on the ends of said shaft, handle bars having their forward ends connected with the cross piece, braces resting on the rear end of the frame and having parts extending upwardly and connected with the handle members, a blade extending transversely of the rear portion of the frame and having risers formed on the ends thereof, the upper ends of said risers contacting the rear portions of the limbs of the frame, bolts passing through parts of the braces and portions of the rear parts of the limbs of the frame and through the upper ends of said risers adjacent the rear edges of said risers, each riser having a forwardly extending extension at its upper end having a vertical row of holes therein, and bolts passing through some of said holes and through parts of the limbs of the frame.

FRANK RICHARD DONOHO.